Dec. 21, 1926.
F. STARR
1,611,790
TRANSMISSION MECHANISM
Filed Oct. 23, 1922
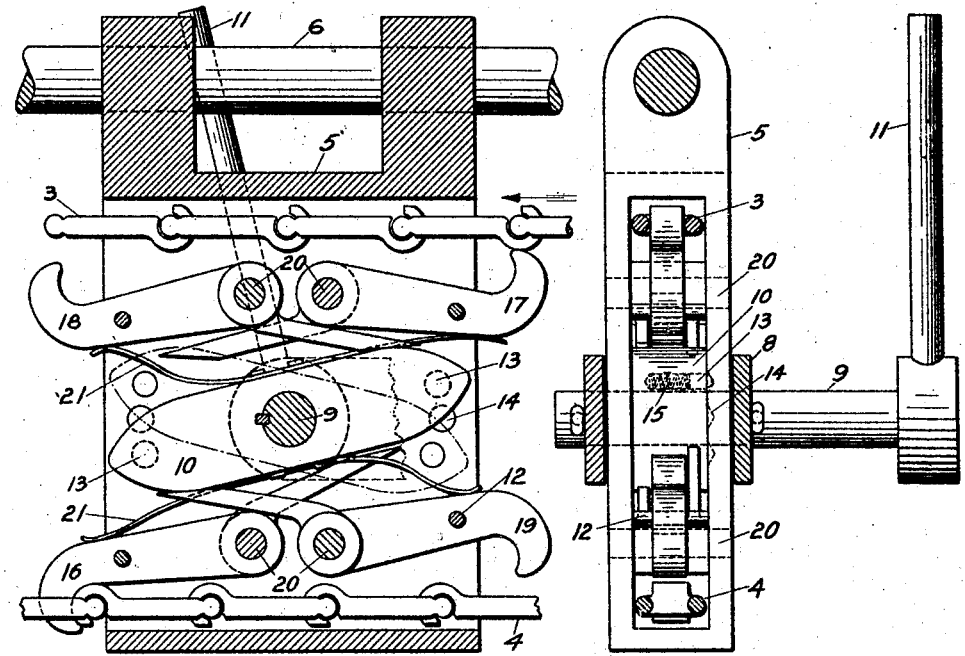
Fig. 1
Fig. 2
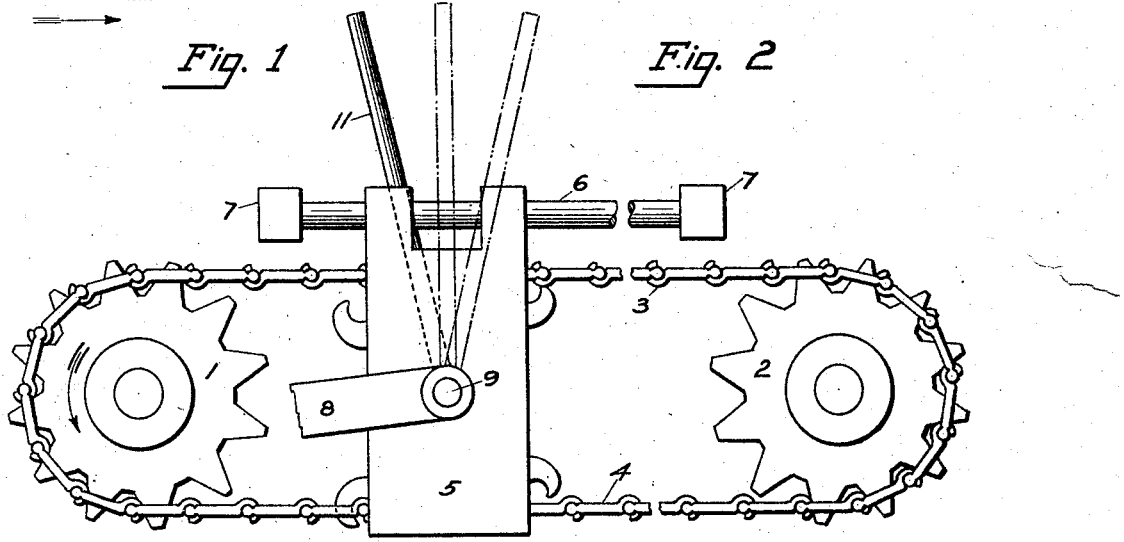
Fig. 3
INVENTOR.
Fred Starr
BY M. C. Frank
ATTORNEY Patented Dec. 21, 1926.

1,611,790

UNITED STATES PATENT OFFICE.

FRED STARR, OF OAKLAND, CALIFORNIA.

TRANSMISSION MECHANISM.

Application filed October 28, 1922. Serial No. 537,484.

My present invention relates to a new motive transmission mechanism, one that is capable of wide application and to a multitude of uses, and is particularly adaptable to occupant-propelled vehicle devices.

The transmission mechanism of present occupant-propelled devices, is such that one stroke of the arm or foot does useful work, while the return stroke of the same does no work, and is therefore, a loss of energy and efficiency. In my transmission device I seek to overcome this, and permit both strokes to do equal, uniform and useful work.

The major object of the invention, is to transform the external forces applied to the cross-head of my device into reciprocal movement thereof, which in turn will impart continuous transmission to a chain belt, which latter will impart rotary motion to a shaft to do useful work. Another object of my invention, and of prime importance is the ability, by reversing a lever, to instantly reverse the motion of the chain belt, without reversing the direction of movement of the cross-head. By accomplishing the latter object, dead-center stops are entirely eliminated.

The invention includes, in general terms, two limbs of a chain belt passing over wheels, a cross-head embracing both limbs and adapted to be reciprocated, said head provided with devices adapted to engage said belt limbs alternately, to keep the belt moving continuously in one direction. The invention also includes means carried by the reciprocating cross-head for reversing said belt movement.

In addition to the above broader features of the invention, there are certain details of design, whereby compactness, simplicity and durability of structure, as well as positiveness and ease of operation are obtained, and which are shown on the accompanying sheet of drawings, and will be set forth hereinafter.

Referring to the drawings:

Figure 1 is a partial sectional elevation, of the operating parts of the apparatus controlling the direction of movement of the chain belt.

Figure 2 is an end elevation of the parts shown in Figure 1, also partly in section.

Figure 3 is a side elevation of the working parts assembled.

In the figures, a link belt passing over sprocket wheels has been selected for an illustration of the invention, but for a specific application of it, I refer one to my issued Patent No. 1,500,854 of July 8, 1924, and titled Child's occupant-propelled vehicle.

In this patent the sprocket wheels are designated by the numerals 1 and 2, and the two limbs of the continuous link belt, by 3 and 4 respectively. 5 is a reciprocating cross-head, supported and guided by bar 6 between fixed members 7, the latter so placed as to maintain the cross-head between and out of contact with the sprocket wheels 1 and 2. A pitman, connecting rod, or other mechanism 8, pivotally connected to the cross-head 5, as at 9, serves to impart the applied forces to give the latter its reciprocating motion.

Between the sides or walls of the cross-head and between the limbs of the link-belt, is an oscillating head 10 mounted on the same shaft 9 which supports and pivots the rod 8. This head is keyed to the said shaft and the latter projects laterally from the cross-head, as seen in Figure 2.

A lever 11 is secured to the shaft 9, by which the head 10 may be oscillated between two extremes, it being held in the position to which it is moved by catch bolts 13, slidably secured in the head and engaging countersunk stops 14, which are formed in the cross-head 5 and into which the bolts are projected by springs 15.

Pawls of hook form 16, 17, 18 and 19 are pivoted in fixed relation to the cross-head 5, as at 20. Each of the pawls is provided with an integral tail piece, normally contacting the head 10 which limits its movement toward the belt. Springs 21, which may be plain flat springs as shown, or otherwise, are secured to the head 10 and press the pawls toward the belt.

The working unit consists of a pair of pawls or hooks diagonally positioned, a hook of the pair may engage any link of the belt for pulling the belt in one direction any distance, while its diagonal mate will ride or bump over the same distance of links moving in the opposite direction, the remaining pair of hooks not functioning. Thus, as shown in Figure 1, the hook 16 is pulling the belt to the right, while its mate 17 is bumping over the links moving to the left, and the other pair of hooks are out of contact entirely with the belt. When it is desired to reverse the direction of the belt, the lever 11 is moved to the other extreme, this will oscillate the head 10 to the position indicated in dot and dash lines in Figure 1, the pawls 16 and 17 are then moved out of reach of the belt, and the pawls 18 and 19 thrown into action, and the cross-head is now ready to move the belt in the reverse direction to that just above described, the cross-head not reversing its direction until it reaches the end of its stroke or travel.

Moving the lever 11 to the middle of its travel, the head 10 will occupy a position parallel to the limbs of the belt, the catch bolts 13 engaging the center stops, and all the pawls will be held in neutral position and out of reach with either limb.

Each pawl, remote from its pivot 20, has a pin 12 secured thereto to serve as an outer bearing between the walls of the cross-head for guiding the hooks into the links.

In the drawings, I have shown only one specific form of my invention, and it is to be understood that the invention may be embodied in other forms, each being a species of my invention.

What I claim as new and desire to secure by Letters Patent of the United States, is the following:

1. A transmission mechanism, comprising in combination, a belt having two limbs, a cross-head adapted to reciprocate along said belt, an oscillating head pivotally mounted on said cross-head, pawls connected to said reciprocating head, said pawls controlled by said oscillating head, means urging said pawls toward said belt, and means restraining said pawls against said urge, said pawls adapted to engage the limbs of the belt alternately.

2. A transmission mechanism comprising in combination, an endless belt, a cross-head adapted to reciprocate along said belt, a plurality of belt-engaging members carried by said cross-head for driving said belt, an oscillating head pivotally mounted on said cross-head for controlling said belt-engaging members, a hand lever rigidly attached to said oscillating head and movable with said reciprocating cross-head for actuating said oscillating head, and spring-actuated bolts slidably secured in the oscillating head and adapted to engage stops in the cross-head in order to retain the oscillating head in position for driving the belt in either direction or to retain the oscillating head in a neutral position.

3. A transmission mechanism comprising in combination, an endless belt, a cross-head adapted to reciprocate along said belt, a plurality of belt-engaging members carried by said cross-head for driving said belt, spring means for holding said belt-engaging members in engagement with said belt, an oscillating head pivotally mounted on said cross-head for controlling said belt-engaging members, a lever formed as a part of said oscillating head, and spring-actuated bolts slidably secured in the oscillating head and adapted to engage stops in the cross-head in order to retain the oscillating head in position for driving the belt in either direction or to retain the oscillating head in a neutral position.

In testimony whereof I affix my signature

FRED STARR.